United States Patent
Lee et al.

(10) Patent No.: US 10,630,563 B2
(45) Date of Patent: Apr. 21, 2020

(54) APPLICATION-DRIVEN CROSS-STRATUM RESOURCE MONITORING

(71) Applicant: Futurewei Technologies, Inc., Plano, TX (US)

(72) Inventors: Young Lee, Plano, TX (US); James N. Guichard, Santa Clara, CA (US); Ricard Vilalta, Barcelona (ES)

(73) Assignee: Futurewei Technologies, Inc., Plano, TX (US)

( * ) Notice: Subject to any disclaimer, the term of this patent is extended or adjusted under 35 U.S.C. 154(b) by 128 days.

(21) Appl. No.: 15/903,985

(22) Filed: Feb. 23, 2018

(65) Prior Publication Data
US 2018/0241651 A1    Aug. 23, 2018

Related U.S. Application Data

(60) Provisional application No. 62/462,836, filed on Feb. 23, 2017.

(51) Int. Cl.
*H04L 12/26* (2006.01)
*H04L 12/24* (2006.01)

(52) U.S. Cl.
CPC .............. *H04L 43/08* (2013.01); *H04L 41/08* (2013.01); *H04L 41/0896* (2013.01); *H04L 43/04* (2013.01)

(58) Field of Classification Search
CPC .......................... H04L 41/08; H04L 41/0896
See application file for complete search history.

(56) References Cited

U.S. PATENT DOCUMENTS

| | | | |
|---|---|---|---|
| 2012/0054346 A1* | 3/2012 | Lee | H04L 41/04 709/226 |
| 2012/0054347 A1* | 3/2012 | Lee | H04L 41/04 709/226 |
| 2012/0106333 A1* | 5/2012 | Lee | H04L 47/125 370/230 |
| 2014/0016467 A1* | 1/2014 | Bernstein | H04L 47/10 370/235 |
| 2014/0098673 A1* | 4/2014 | Lee | H04L 45/64 370/238 |

(Continued)

OTHER PUBLICATIONS

Velasco et al., "Cross-Stratum Orchestration and Flexgrid Optical Networks for Data Center Federations," IEEE Network, Nov./Dec. 2013. (Year: 2013).*

(Continued)

*Primary Examiner* — Alina A Boutah
(74) *Attorney, Agent, or Firm* — Schwegman Lundberg & Woessner, P.A.

(57) ABSTRACT

A method and system for application-driven proactive multi-stratum resource monitoring in software defined networks (SDN). A Cross-Stratum Optimization (CSO) service orchestrator obtains a service intent, a notification subscription, and a programmable performance rule specified by an application. The CSO service orchestrator collects streaming performance data in a network based on the notification subscription, evaluates performance of the network using the collected data and the programmable performance rule, and allocates one or more of storage, computer, and network resources based on the evaluation to ensure quality of service for the application.

20 Claims, 24 Drawing Sheets

(56) References Cited

U.S. PATENT DOCUMENTS

| | | | |
|---|---|---|---|
| 2014/0244835 A1* | 8/2014 | Lopez Alvarez ... | H04L 41/5067 709/224 |
| 2015/0180765 A1* | 6/2015 | Lopez Alvarez ..... | H04L 69/321 709/242 |
| 2016/0337249 A1* | 11/2016 | Zhang ................. | H04L 47/2483 |
| 2017/0052536 A1* | 2/2017 | Warner ............ | G06Q 10/06312 |

OTHER PUBLICATIONS

Yang et al., "Cross Stratum Optimization Architecture for Optical as a Service," Internet Draft, Huawei Technologies Co., Oct. 18, 2012. (Year: 2012).*

Yang et al., "Performance evaluation of multi-stratum resources optimization with network functions virtualization for cloud-based radio over optical fiber networks," Optical Society of America, 2016. (Year: 2016).*

"Mapping Cross Strutum Ochestration (CSO) to the SDN Architecture," Open Networking Foundation, Issue 1, Mar. 11, 2016 (Year: 2016).*

Lee, Y., et al., "Use Cases for Cross-Stratum Optimization", Internet Draft, Teas Working Group, [online]. Retrieved from the Internet: <URL: http://tools.ietf.org/html/draft-lee-teas-cso-use-cases-00>, 14 pgs.

* cited by examiner

```
module cso-dc
{
  namespace "urn:ietf:params:xml:ns:yang:cso:dc";
  prefix "dc";

import ietf-inet-types {
    prefix "inet";
  } import ietf-actn-vn {
    prefix "actn-vn";
  } revision 2017-01-16 {
    description
      "Initial revision. This YANG file defines
       the reusable base types for CSO DC description.";
    reference
      "Derived from earlier versions of base YANG files";
  }

// Abstract models
  grouping resource-element {
    leaf id { type string; }
    leaf name { type string; }
  } grouping resource-instance {
    leaf project{ type string; }
    leaf status {
      type enumeration {
        enum active;
        enum inactive;
        enum pending;
      }
    }
    uses resource-element;
  }
  // Compute models
  grouping format {
    leaf container {
      type enumeration { enum ami; enum ari; enum aki; enum bare; enum ovf; }
      default bare;
    }
    leaf disk {
      type enumeration { enum ami; enum ari; enum aki; enum vhd; enum vmdk; enum raw; enum qcow2; enum vdi; enum iso; }
      default qcow2;
    }
  }
```

*FIG. 10A*

```
grouping image {
  leaf checksum { type string; mandatory true; }
  leaf size { type uint32; units 'Bytes'; mandatory true; } container format {
    uses format;
  } uses resource-element;
} grouping flavor {
  leaf disk  { type uint32; units 'GB'; default 0; }
  leaf ram   { type uint32; units 'MB'; default 0; }
  leaf vcpus { type uint16; default 0; }
  uses resource-element;
} grouping ram {
  leaf total { type uint32; units 'MB'; }
  leaf used  { type uint32; units 'MB'; }
  leaf free  { type uint32; units 'MB'; }
} grouping disk {
  leaf total { type uint32; units 'GB'; }
  leaf used  { type uint32; units 'GB'; }
  leaf free  { type uint32; units 'GB'; }
} grouping vcpu {
  leaf total { type uint16; }
  leaf used  { type uint16; }
  leaf free  { type uint16; }
} grouping hypervisor { container ram {
    uses ram;
  } container disk {
    uses disk;
  } container vcpu {
    uses vcpu;
  } leaf-list instance { type leafref { path '/cso/dc/instance/id'; } }
  uses resource-element;
}
```

FIG. 10B

```
grouping instance {
  container flavor { uses flavor; }
  container image { uses image; }
  leaf hypervisor { type leafref { path '/cso/dc/hypervisor/
id'; } }
  leaf-list port { type leafref { path '/cso/dc/network/
subnetwork/port/id'; } }
  uses resource-instance;
} grouping dc-monitoring-param {
  leaf name { description "dc-monitoring-param identifier";
type string; }
  leaf value-string {
    description
      "Current value for a string parameter";
    type string;
  }
} grouping dc { list hypervisor {
    key id;
    uses hypervisor;
  } list instance {
    key id;
    uses instance;
  } list image {
    key id;
    uses image;
  } list flavor {
    key id;
    uses flavor;
  } list dc-monitoring-param {
      key "name";
      uses dc-monitoring-param;
  }
\
  list network {
      key id;
      uses network;
  } leaf-list ap { type leafref { path '/actn-vn:actn/actn-
vn:ap/actn-vn:access-point-list/actn-vn:access-point-id'; } }
  leaf cso-ref { type leafref { path "/cso/cso-id"; } }
  uses resource-element;
}
```

*FIG. 10C*

```
  container cso {
    list dc {
        key id;
        uses dc;
    } leaf cso-id { type string; }
  }

// Network models
  grouping ip-address {
    leaf ip-address { type inet:ip-address; }
  } grouping dhcp-agent {
    leaf enabled { type boolean; }
    list pools {
      key ip-address;
      uses ip-address;
    }
    uses resource-instance;
  } grouping network {
    list subnetwork {
      key id;
      uses subnetwork;
    }
    list dhcp-agent {
      key id;
      uses dhcp-agent;
    }
    uses resource-instance;
    leaf cso-ref { type leafref { path "/cso/cso-id"; } }
  } grouping subnetwork {
    list port {
      key id;
      uses port;
    }
    uses resource-instance;
  } grouping port {
    leaf ip-address { type inet:ip-address; }
    leaf instance { type leafref { path '/cso/dc/instance/
id'; } }
    uses resource-instance;
  }

```
module cso-service
{
  namespace "urn:ietf:params:xml:ns:yang:cso:service";
  prefix "service";

import ietf-actn-vn {
    prefix "vn";
  } import cso-dc {
    prefix "cso-dc";
  } revision 2017-01-16 {
    description
      "Initial revision. This YANG file defines
       the reusable base types for CSO Service description.";
    reference
      "Derived from earlier versions of base YANG files";
  } grouping reservation {
    leaf max-future-start-range {
      description
        "Enforce reservation request 'start' time is within
allowed range from now";
      type uint16 { range 0..365; }
      units "days";
    }
    leaf max-future-end-range {
      description
        "Enforce reservation request 'end' time is within
allowed range from now";
      type uint16 { range 0..365; }
      units "days";

}
    leaf max-duration {
      description
        "Enforce reservation duration (end-start) does not
exceed specified threshold";
      type uint16;
      units "hours";
      default 8760; // for now cap it at max one year as
default
    }
    leaf expiry {
      description
        "Duration in minutes from start when unallocated
reserved resources
         will be released back into the pool";
      type uint32;
      units "minutes";
    }
  }
```

FIG. 11A

```
grouping pricing {
  leaf cost {
    type uint32;
  }
} grouping scaling-criteria {
  leaf name { type string; }
  leaf scale-in-threshold {
    description
        "Value below which scale-in requests are generated";
    type uint64;
  } leaf scale-out-threshold {
    description
        "Value above which scale-out requests are
            generated";
    type uint64;
  } leaf app-monitoring-param {
    description
        "Reference to the NS level monitoring parameter
            that is aggregated";
    type leafref {
      path "/app-catalog/monitoring-param/name";
    }
  } container network-monitoring-param {
      uses vn:vn-monitoring-param;
  }
} typedef scaling-criteria-operation {
  type enumeration {
    enum AND;
    enum OR;
  }
} grouping scaling-intent {
  leaf scale-in-operation-type {
    description
        "Operation to be applied to check between scaling
            criterias to check if the scale in threshold
            condition has been met. Defaults to AND";
    type scaling-criteria-operation;
    default AND;
  }
```

*FIG. 11B*

```
leaf scale-out-operation-type {
  description
      "Operation to be applied to check between scaling
          criterias to check if the scale out threshold
          condition has been met. Defauls to OR";
  type scaling-criteria-operation;
  default OR;
}
leaf threshold-time {
  description
    "The duration for which the criteria must hold true";
  type uint32;
} leaf cooldown-time {
  description
    "The duration after a scaling-in/scaling-out action
        has been triggered, for which there will be no
        further optional";
  type uint32;
}
list scaling-criteria {
  description
      "list of conditions to be met for generating scaling
          requests";
  key "name";
  uses scaling-criteria;
  }
} grouping compute-intent {
  list flavor { key id; uses cso-dc:flavor; }
} grouping network-intent {
  // Aligned with a grouping in vn
  uses vn:service-metric;
} grouping notification-subscription {
  leaf id { description "Notification identifier"; type
    string; }
  //TBD extend with a notification mechanism
} grouping service-intent {
  container compute-intent { uses compute-intent; }
  container network-intent { uses network-intent; }
  container scaling-intent { uses scaling-intent; }
  container reservation { uses reservation; }
  container pricing { uses pricing; }
  list notification-subscription { key id; uses
    notification-subscription; }
}
```

*FIG. 11C*

```
grouping app-instance {
  leaf id { description "App identifier"; type string; }
  leaf app { type leafref { path "/app-catalog/name"; } }
  leaf-list instance { type leafref { path '/cso-dc:cso/cso-
    dc:dc/cso-dc:instance/cso-dc:id'; } }
} grouping service {
  leaf id { description "Service identifier"; type string; }
  container intent { uses service-intent; }
  leaf-list instance { type leafref { path '/cso-dc:cso/cso-
    dc:dc/cso-dc:instance/cso-dc:id'; } }
  list app-instance { key id; uses app-instance; }
  leaf vn { type leafref { path '/vn:actn/vn:vn/vn:vn-list/
    vn:vn-id'; } }
  leaf-list ap { type leafref { path '/vn:actn/vn:ap/
    vn:access-point-list/vn:access-point-id'; } }
} list service {
  key "id";
  uses service;
} grouping app-monitoring-param {
  leaf name { description "app-monitoring-param identifier";
    type string; }
  leaf value-string {
    description
        "Current value for a string parameter";
    type string;
  }
} grouping app {
  leaf name { description "Application name"; type string; }
  leaf image { type leafref { path '/cso-dc:cso/cso-dc:dc/
    cso-dc:image/cso-dc:id'; } }
  leaf preloaded-config { type string; }
  list monitoring-param {
    key name;
    uses app-monitoring-param;
  }
} list app-catalog {
  key name;
  uses app;
}

```
module ietf-te-telemetry { namespace "urn:ietf:params:xml:ns:yang:ietf-te-telemetry";

prefix "telemetry";

import ietf-actn-vn {
        prefix "actn-vn";
    } revision 2017-01-16 {
        description
            "Initial revision. This YANG file defines
            the reusable base types for TE telemetry.";
        reference
            "Derived from earlier versions of base YANG files";
    }

/** Augments */
    augment "/actn-vn:actn-state/actn-vn:vn/actn-vn:vn-list" {
        description
            "Augmentation parameters for TE topologies.";
        list vn-telemetry { key "name"; uses vn-telemetry; }
    } augment "/actn-vn:actn/actn-vn:vn/actn-vn:vn-list" {
        description
            "Augmentation parameters for TE topologies.";
        uses scaling-intent;
    }

/** Identities */
    identity vn-telemetry-param {
        description
            "Base identity for vn telemetry params";
    } identity bandwidth {
        base vn-telemetry-param;
        description
            "Current measured bandwidth";
        reference "RFCXXXX";
    } identity latency {
        base vn-telemetry-param;
        description
            "Current measured latency";
        reference "RFCXXXX";
    } identity jitter {
        base vn-telemetry-param;
        description
            "Current measured jitter";
        reference "RFCXXXX";
    }
```

FIG. 12A

```
identity packet-loss-rate {
    base vn-telemetry-param;
    description
        "Current measured bandwidth";
    reference "RFCXXXX";
}

/** Enums */
typedef notification-type {
  type enumeration {
      enum object-creation;
      enum object-deletion;
      enum attribute-value-change;
  }
} typedef scaling-criteria-operation {
    type enumeration {
        enum AND;
        enum OR;
    }
}

/** groupings */
grouping scaling-criteria {
    leaf name { type string; }
    leaf scale-in-threshold {
        description
            "Value below which scale-in requests are
                generated";
        type uint64;
    } leaf scale-out-threshold {
        description
          "Value above which scale-out requests are
              generated";
        type uint64;
    } leaf vn-telemetry {
        config false;
        description
          "Reference to the NS level monitoring parameter
              that is aggregated";
        type leafref {
            path "/actn-vn:actn-state/actn-vn:vn/actn-
                    vn:vn-list/vn-telemetry/name";
        }
    }
}
```

FIG. 12B

```
grouping scaling-intent {
    leaf scale-in-operation-type {
    description
      "Operation to be applied to check between scaling
         criterias to check if the scale in threshold
         condition has been met.
       Defaults to AND";
    type scaling-criteria-operation;
    default AND;
    } leaf scale-out-operation-type {
    description
      "Operation to be applied to check between scaling
         criterias to check if the scale out threshold
         condition has been met.
       Defauls to OR";
    type scaling-criteria-operation;
    default OR;
    } leaf threshold-time {
    description
    "The duration for which the criteria must hold true";
    type uint32;
    } leaf cooldown-time {
    description
    "The duration after a scaling-in/scaling-out action
       has been triggered, for which there will be no
       further optional";
    type uint32;
    }
    list scaling-criteria {
    description
      "list of conditions to be met for generating scaling
         requests";
    key "name";
    uses scaling-criteria;
    }
}
```

FIG. 12C

```
grouping vn-telemetry {
    leaf name { description "vn-monitoring-param
       identifier"; type string; }
    leaf value-string { description "Current value for a
       string parameter"; type string; }
    leaf ap-ref{ type leafref{ path '/actn-vn:actn-state/
       actn-vn:ap/actn-vn:access-point-list/actn-vn:access-
       point-id'; } }
    leaf vn-member-ref{ type leafref{ path '/actn-vn:actn-
       state/actn-vn:vn/actn-vn:vn-list/actn-vn:vn-member-
       list/actn-vn:vn-member-id'; } }
    leaf vn-ref{ type leafref{ path '/actn-vn:actn-state/
       actn-vn:vn/actn-vn:vn-list/actn-vn:vn-id'; } } leaf param {
        type identityref {
            base vn-telemetry-param;
        }
    }
}

/** Notifications */
notification vn-telemetry { uses vn-telemetry; }
}
```

*FIG. 12D*

APPLICATION-DRIVEN CROSS-STRATUM RESOURCE MONITORING

RELATED APPLICATIONS

This application claims the benefit of priority under 35 U.S.C. § 119(e) to U.S. Provisional Patent Application Ser. No. 62/462,836, filed Feb. 23, 2017, which is incorporated herein by reference in its entirety.

TECHNICAL FIELD

The present disclosure is related to software defined networks (SDN), and in particular to methods and systems for application-driven cross-stratum resource monitoring.

BACKGROUND

Networks are getting larger to handle communications between more and more devices. Networks need to be designed and managed to handle a commensurate increase in traffic. Software defined networks (SDN) involve the use of software running on a centralized controller to view network traffic and make network control programmable at a high level, the control plane, by decoupling network control from traffic forwarding functions of the data plane.

To ensure acceptable network performance, an improved system and method for resource monitoring and allocation for SDN is needed.

SUMMARY

A method and system for application-driven cross-stratum resource monitoring is provided. Various examples are now described to introduce a selection of concepts in a simplified form that are further described below in the detailed description. The Summary is not intended to identify key or essential features of the claimed subject matter, nor is it intended to be used to limit the scope of the claimed subject matter.

According to one aspect of the present disclosure, a method of using a Cross-Stratum Optimization (CSO) service orchestrator is provided. The method comprises obtaining a service intent, a notification subscription, and a programmable performance rule specified by an application, and collecting streaming performance data in a network using the CSO service orchestrator based on the notification subscription. The method further comprises evaluating performance of the network using the collected data and the programmable performance rule, and allocating one or more of storage, computer, and network resources based on the evaluation to ensure quality of service for the application.

Optionally, in any of the preceding aspects, the network is a software defined network (SDN). Optionally, in any of the preceding aspects, the service intent includes one or more of compute intent, network intent, scaling intent, reservation, and pricing. Optionally, in any of the preceding aspects, allocating resources includes adding a transport network for communication among controllers. Optionally, in any of the preceding aspects, allocating resources includes adding multiple transport networks for communication among controllers. Optionally, in any of the preceding aspects, allocating resources includes removing a transport network for communication among controllers. Optionally, in any of the preceding aspects, allocating resources includes removing multiple transport networks for communication among controllers. Optionally, in any of the preceding aspects, the CSO service orchestrator is configured to change an end-to-end provisioning path based on the evaluation.

According to another aspect of the present disclosure, a Cross-Stratum Optimization (CSO) service orchestrator device is provided. The device comprises a memory configured to store programmable instructions, and a processor configured to act on the instructions to perform the steps of: obtaining a service intent, a notification subscription, and a programmable performance rule specified by an application; collecting streaming performance data in a network based on the notification subscription; evaluating performance of the network using the collected data and the programmable performance rule; and allocating one or more of storage, computer, and network resources based on the evaluation to ensure quality of service for the application.

Optionally, in any of the preceding aspects, the processor is configured to collect, evaluate, and allocate in a closed loop system. Optionally, in any of the preceding aspects, the device is configured for cross-stratum operation in a software defined networks (SDN) telemetry network. Optionally, in any of the preceding aspects, the processor is configured to collect data from mobile terminals, infrastructure equipment and service, IP/transport SDN controllers, data center (DC) SDN controllers, and orchestrators. Optionally, in any of the preceding aspects, the programmable performance rule relates to an amount of data. Optionally, in any of the preceding aspects, the programmable performance rule relates to a latency amount. Optionally, in any of the preceding aspects, the processor is configured to allocate network resources by determining an alternate communication path between existing end points. Optionally, in any of the preceding aspects, the processor is configured to allocate network resources by creating a new communication path that includes a new end point.

According to another aspect of the present disclosure, a non-transitory computer-readable medium is provided. The computer-readable medium stores computer instructions, that when executed by one or more processors of a network device, cause the one or more processors to perform steps of: obtaining a service intent, a notification subscription, and a programmable performance rule specified by an application; collecting streaming performance data in a network using a Cross-Stratum Optimization (CSO) service orchestrator based on the notification subscription; evaluating performance of the network using the collected data and the programmable performance rule; and allocating one or more of storage, computer, and network resources based on the evaluation to ensure quality of service for the application.

Optionally, in any of the preceding aspects, the network includes an aggregated telemetry network. Optionally, in any of the preceding aspects, evaluating network performance includes evaluating end-to-end (E2E) key performance indicators (KPIs). Optionally, in any of the preceding aspects, the CSO service orchestrator is configured to send a reconfiguration request message to a multi-domain service coordinator (MDSC) for distribution based on the allocation.

This Summary is an overview of some of the teachings of the present application and not intended to be an exclusive or exhaustive treatment of the present subject matter. Further details about the present subject matter are found in the detailed description and appended claims. The scope of the present inventive subject matter is defined by the appended claims and their legal equivalents.

BRIEF DESCRIPTION OF THE DRAWINGS

FIGS. 10A-10D, 11A-11D, and 12A-12D illustrate code listings of modules for performing methods according to example embodiments.

DETAILED DESCRIPTION

Figure 1A:
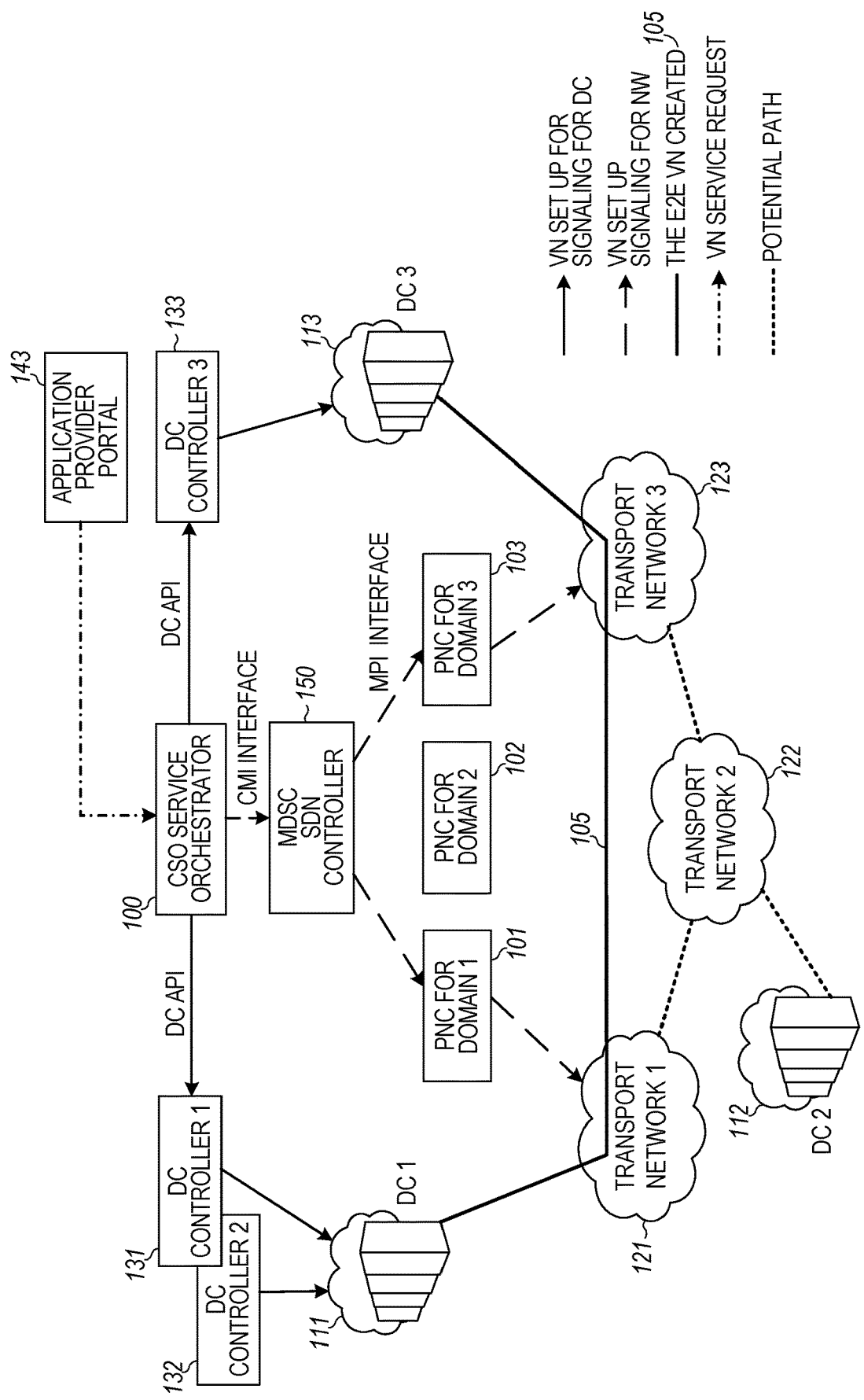
FIGS. 1A and 1B are block diagrams of an initial end-to-end tunnel setup in a network, according to various embodiments.

In the following description, reference is made to the accompanying drawings that form a part hereof, and in which is shown by way of illustration specific embodiments which may be practiced. These embodiments are described in sufficient detail to enable those skilled in the art to practice the inventive subject matter, and it is to be understood that other embodiments may be utilized and that structural, logical and electrical changes may be made without departing from the scope of the present disclosure. The following description of example embodiments is, therefore, not to be taken in a limited sense, and the scope of the present inventive subject matter is defined by the appended claims.

The functions or algorithms described herein may be implemented in software in one embodiment. The software may consist of computer-executable instructions stored on computer-readable media or computer-readable storage device such as one or more non-transitory memories or other type of hardware based storage devices, either local or networked. Further, such functions correspond to modules, which may be software, hardware, firmware, or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

Increasing use of computer services means the service companies have to provide ever larger computer networks to handle the increasing loads. The computer networks may include a plurality of servers coupled together over a network. The network may be either wired (e.g., Ethernet, cable, fiber optics) or wireless (e.g., radio). Each server may be referred to as a node within the network.

In performing a computer service within the network, it may be necessary for one computer to access another computer to communicate data. To communicate data between computers, the source computer (e.g., source node) finds a path to the destination computer (e.g., destination node) through the various paths that connect the two nodes. However, as these networks grow, finding the shortest path becomes increasingly time consuming and, thus, expensive in terms of computer time.

An emerging networking paradigm that separates a network control plane from a data forwarding plane is a software-defined network (SDN). As a promising paradigm for dramatically improving network resource utilization, simplifying network management, reducing operating costs, and promoting innovation and evolution, SDN has shown great potential for data center networks and the next-generation Internet.

Recently, SDN has been extended to support 5G communication networks. The main functions of SDN are (i) to separate the data plane from the control plane and (ii) to introduce novel network control functionalities based on an abstract representation of the network. In current instantiations of SDN, these functions are realized by (i) removing control decisions (e.g., routing) from the hardware (e.g., switches or routers), (ii) enabling programmable flow tables in the hardware through an open, standardized interface (e.g., Openflow—a protocol that allows a server to tell network switches where to send packets), and (iii) using a logically centralized network controller that defines the behavior and operation of the network forwarding infrastructure.

Existing work to address these problems focuses on balancing data traffic in the data plane, which aims to evenly distribute data traffic flows among network links. Further work focuses on the pure facility allocation problem, which considers the optimal network planning for the minimum required facilities, and does not take into account specific application requirements for traffic performance.

The present subject matter is in the area of SDN telemetry and Cross-Stratum Optimization (CSO). Layers of the stratum include compute, control and network level monitoring, in various embodiments. The present subject matter provides application-driven proactive multi-stratum resource monitoring method and system. In various embodiments, an application defines its own service catalogue in which to specify service intent (network, compute, service duration, scaling policy, etc.) and notification subscription definition. According to various embodiments, the notification subscription mechanism collects streaming data defined using the service catalogue to perform a proactive performance evaluation. The present subject matter supports re-assignment of storage, compute, and/or network resources to ensure the application's quality of service and experience based on a programmable rule set by the application.

The present subject matter provides a closed loop, allowing for optimization prior to failure of an end-to-end communication tunnel or network and, in various embodiments, allowing for a customer/application to set their own resource/performance metrics so that each application can have resources determined in a customized manner A CSO service orchestrator actively monitors the network using the metrics so that performance degradation or failure in the tunnel or network can be detected and avoided before it happens.

In various embodiments, the present method is executed across stratum and is multi-disciplinary and multi-layered in its approach, in contrast to a typical telemetry network, which is a single layer OAM (operations, administration, and maintenance). According to various embodiments, the present subject matter can be used with aggregated telemetry, as end-to-end (E2E) key performance indicators (KPIs) differ from locally measured ones. In addition, this subject matter provides a method for an autonomous loop, where telemetry is considered and actions are taken across networks and Data Centers (DC). This subject matter can be used for mobile terminals, infrastructure equipment and service, IP/transport SDN controllers, DC SDN controllers, and/or orchestrators, in various embodiments.

The present subject matter provides for an application-driven resource management, such that the application can subscribe for data streaming, and can set programmable performance rules for resource allocation. In one example, the programmable performance rules relate to data amount or size (e.g., bandwidth) and latency. The CSO service orchestrator can find an alternate path between the same end points, or create a new path that includes a new E2E endpoint, in various embodiments.

Additional abbreviations used herein include: transport network (TN), physical network controller (PNC), virtual network (VN), multi-domain service coordinator (MDSC), traffic-engineered (TE) network, abstraction and control of traffic-engineering networks (ACTN), northbound interface (NBI), application program interface (API), customer network controller (CNC), CNC-MDSC interface (CMI), network (NW), network element (NE), message passing interface (MPI), hypertext transfer protocol (HTTP), and network function virtualization (NFV).

Figure 1B:
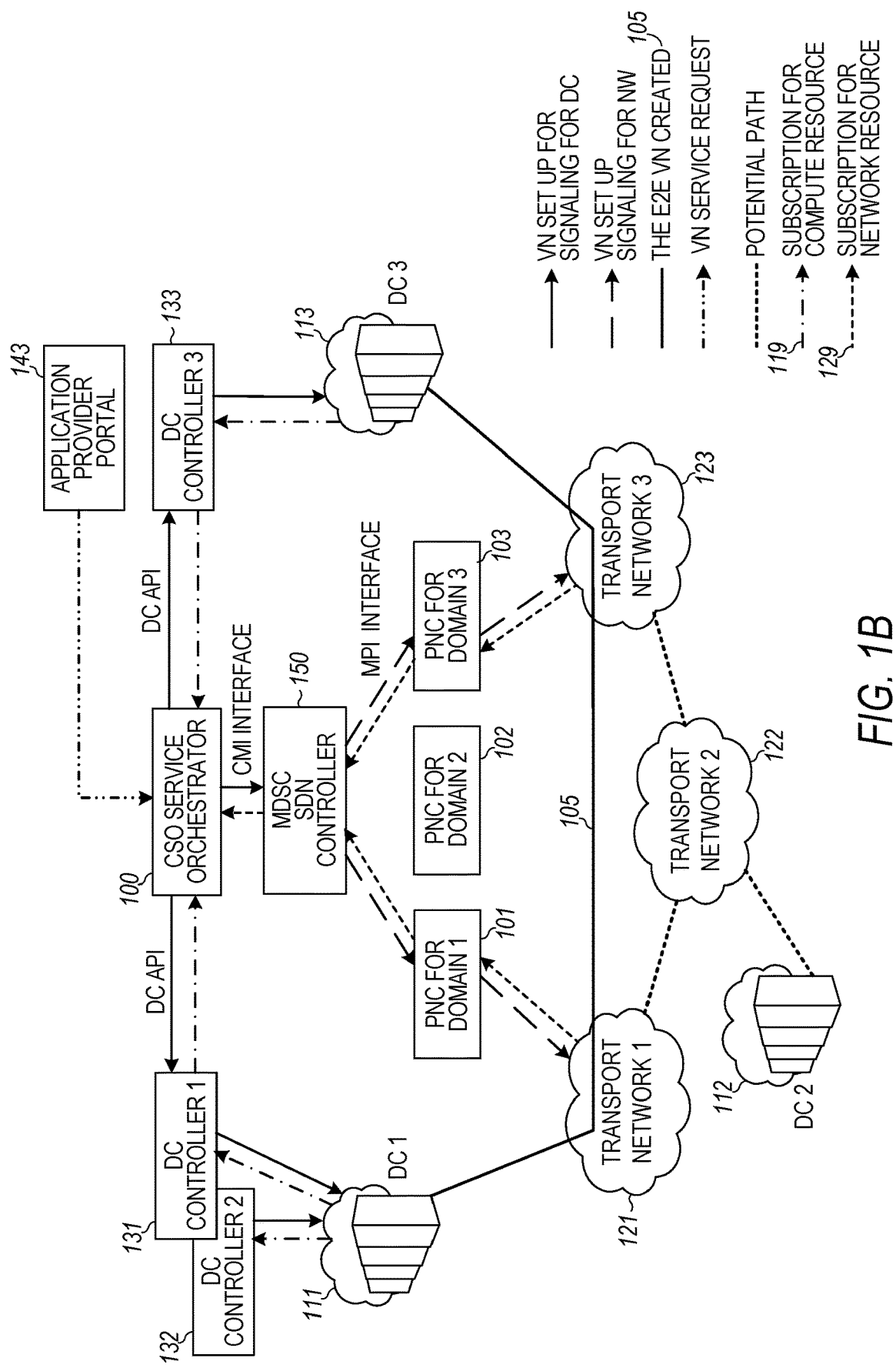

FIGS. 1A and 1B illustrate block diagrams of an initial end-to-end tunnel set up, according to various embodiments. The depicted set up includes a CSO service orchestrator 100 that receives service requests from an application provider portal 143 and communicates with DC Controllers 131, 132, 133 and MSDC SDN controller 150 to monitor and control traffic. The MSDC SDN controller 150 interfaces with PNCs 101, 102, 103 to manage communication in transport networks 121, 122, 123 between data centers 111, 112, 113. In FIG. 1A, the CSO service orchestrator 100 of the present subject matter monitors traffic in a network with an initial setup that has a VN path 105 created from a source node DC1 (111) to TN1 (121) to TN3 (123) to a destination node DC3 (113). The CSO service orchestrator 100 sets up signaling for the network using a CMI interface to MDSC SDN controller 150, which communicates via an MPI interface with PNC for domain 1 (101), PNC for domain 2 (102), and PNC for domain 3 (103). The PNCs 101, 102, 103 relay information to transport networks, including Transport Network 1 (TN1, 121), Transport Network 2 (TN2, 122), and Transport Network 3 (TN3, 123). The CSO service orchestrator 100 also uses a DC API to communicate with DC controllers, including DC Controller 1 (131), DC Controller 2 (132), and DC Controller 3 (133), and further receives a VN service request from application provider portal 143.

FIG. 1B illustrates a return communication 119 from the DC controllers 131, 132, 133 to the CSO service orchestrator 100 to obtain a subscription for a computing resource, and further illustrates a return communication 129 from the transport networks (in this case TN1 (121) and TN3 (123)) to the CSO service orchestrator 100 to obtain a subscription for network resources.

Figure 2:
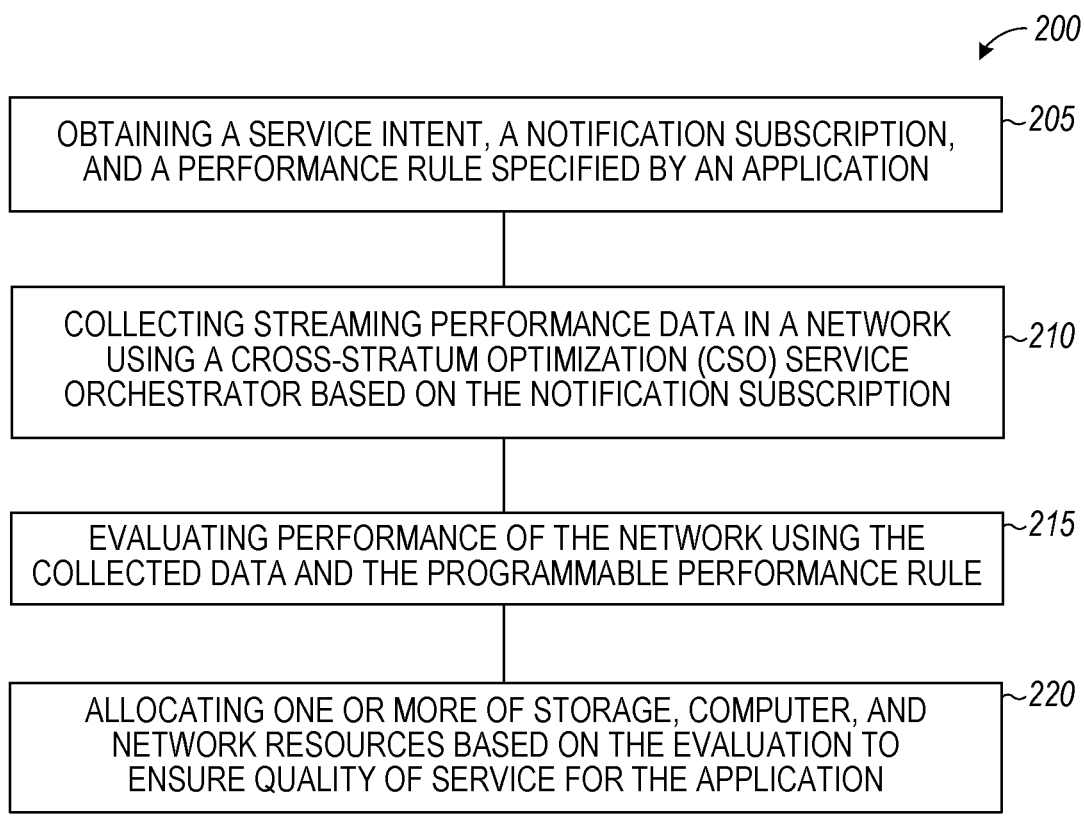
FIG. 2 is a flow diagram for a method for application-driven cross-stratum resource monitoring, according to various embodiments.

FIG. 2 illustrates a flow diagram for a method for application-driven cross-stratum resource monitoring, according to various embodiments. The method 200 includes obtaining a service intent, a notification subscription, and a programmable performance rule specified by an application, at step 205, and collecting streaming performance data in a network using the CSO service orchestrator based on the notification subscription, at step 210. The method 200 further includes evaluating performance of the network using the collected data and the programmable performance rule, at step 215, and allocating one or more of storage, computer, and network resources based on the evaluation to ensure quality of service for the application, at step 220. According to various embodiments, service intent includes one or more of compute intent, network intent, scaling intent, reservation, and pricing. In various embodiments, compute intent refers to requirements of the application of a customer for compute resources associated with the service the customer desires. In various embodiments, network intent refers to requirements of the customer for local area network or wide area network constraints such as bandwidth and latency. In various embodiments, scaling intent refers to requirements of the customer for compute or network resources, such as to how to scale in and out based on the thresholds set by the customer. In various embodiments, a reservation refers to requirements of the customer to reserve resources exclusively available for the services/application. In various embodiments, pricing refers to the price/cost negotiated between the service provider and the customer, which can be dynamically negotiated.

Figure 3A:
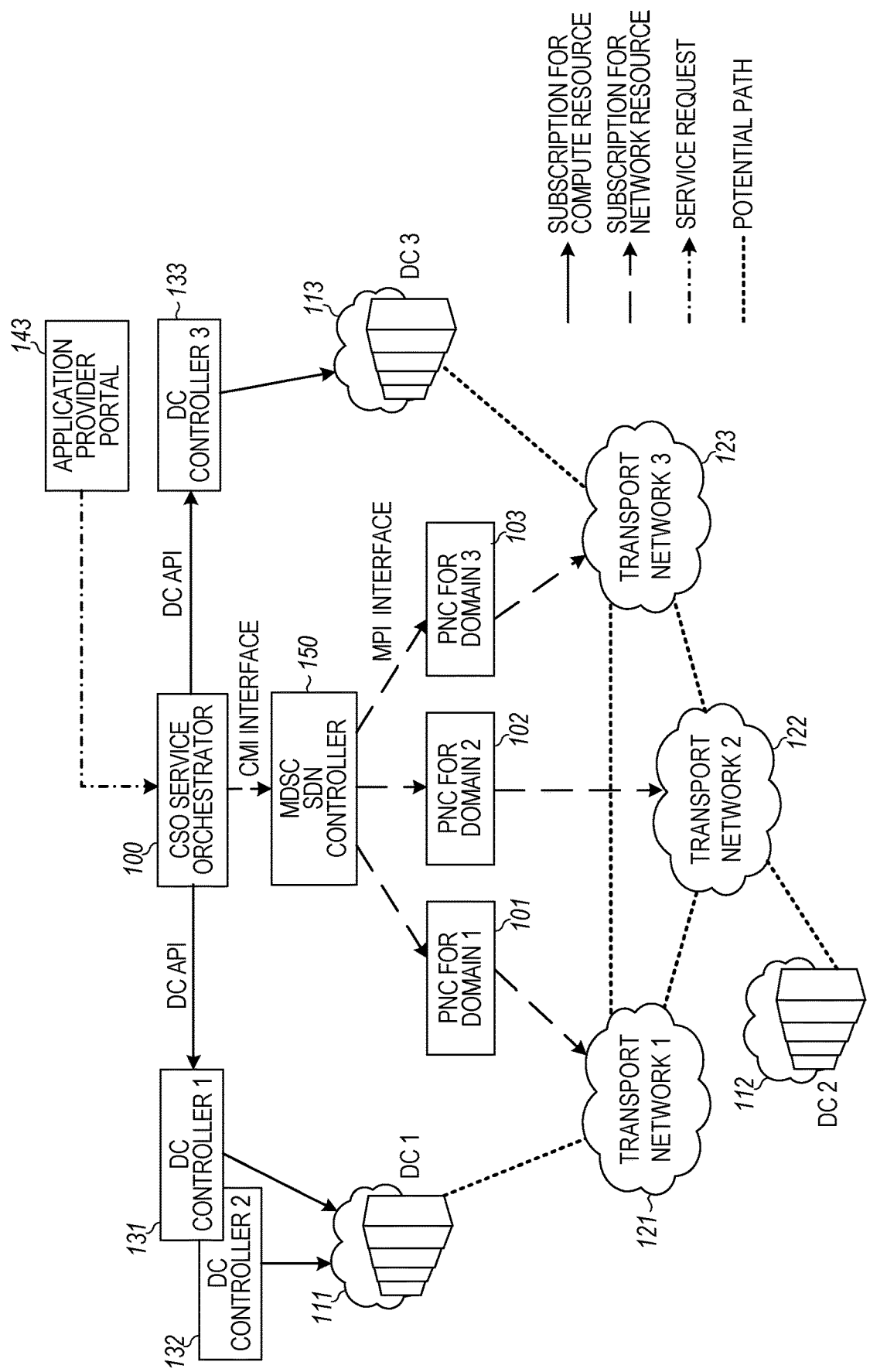
FIGS. 3A and 3B are notification subscription and publication flow diagrams for a system for application-driven cross-stratum resource monitoring, according to various embodiments.

FIG. 3A illustrates a notification subscription flow diagram for a system for application-driven cross-stratum resource monitoring, according to various embodiments. Many of the figures, including FIGS. 1A, 1B, 3A, 3B, 4A, 4B and 5, contain like reference numbers for like components. The CSO service orchestrator 100 creates performance parameters for the application provider portal 143 and sends a subscription message to MDSC SDN controller 150 and to the DC controllers 131, 132, 133. In this embodiment, the subscription notification is recursively sent down to PNCs 101, 102, 103 and network elements such as TNs 121, 122, 123 for network parameters, and to DC controllers 131, 132, 133 for compute parameters.

Figure 3B:
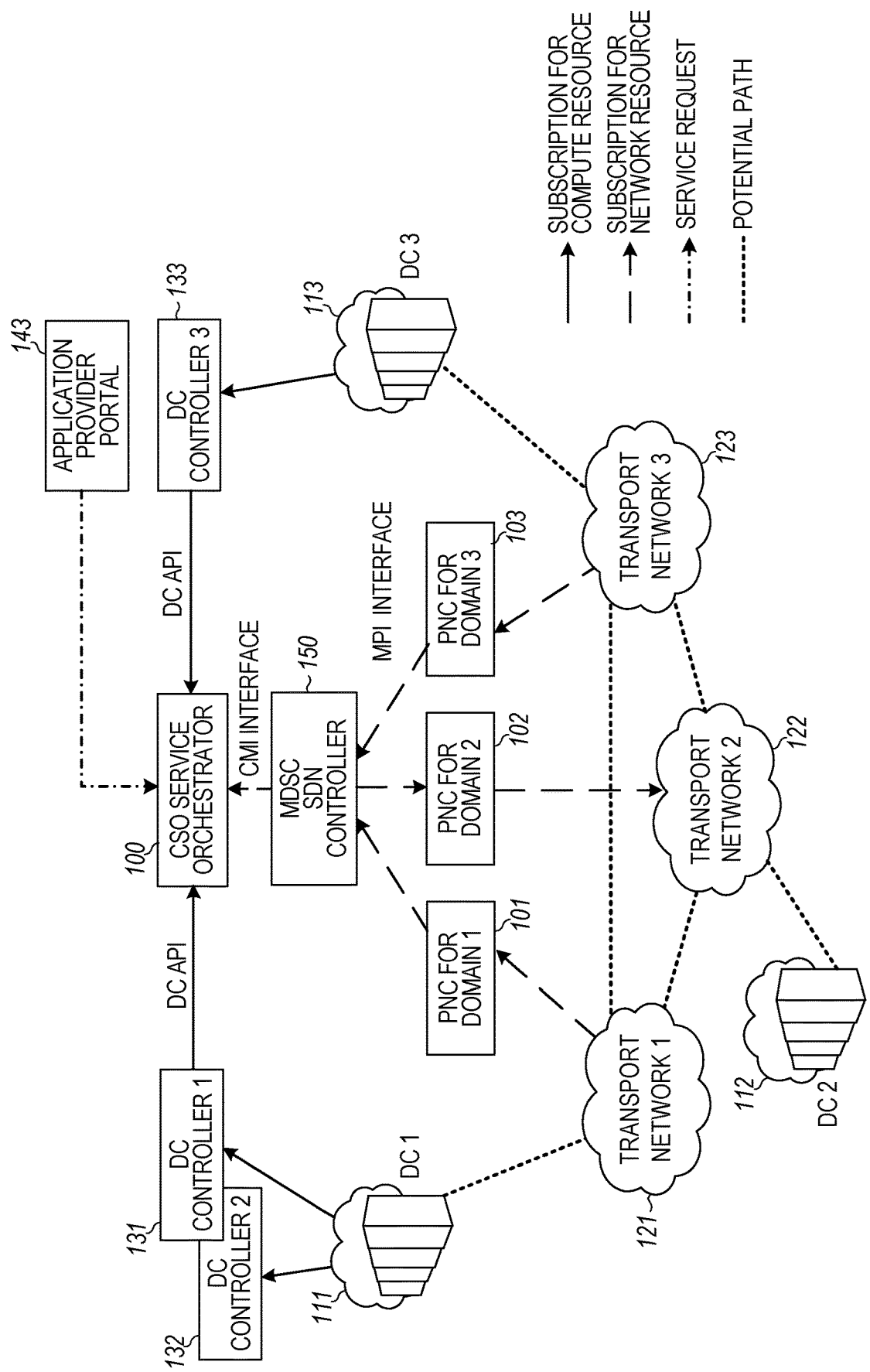

FIG. 3B illustrates a notification publication flow diagram for a system for application-driven cross-stratum resource monitoring, according to various embodiments. In the depicted embodiment, each of the network elements such as TNs 121, 122, 123, and each of the DC controllers 131, 132, 133, push or publish the subscribed parameters to the NBI when conditions of the subscription are met. An NBI of a component is an interface that conceptualizes the lower level details (e.g., data or functions) used by, or in, the component. An NBI is used to interface with higher level layers using the southbound interface (SBI) of the higher level component, in various embodiments. The network-related publication notification is recursively sent up to PNCs 101, 102, 103, and then to MDSC SDN controller 150, and finally to CSO service orchestrator 100 for network parameters. Likewise, the data center compute-related publication notification is recursively sent up to DC controllers 131, 132, 133 and the CSO service orchestrator 100 for compute resources and parameters, in various embodiments.

Figure 4A:
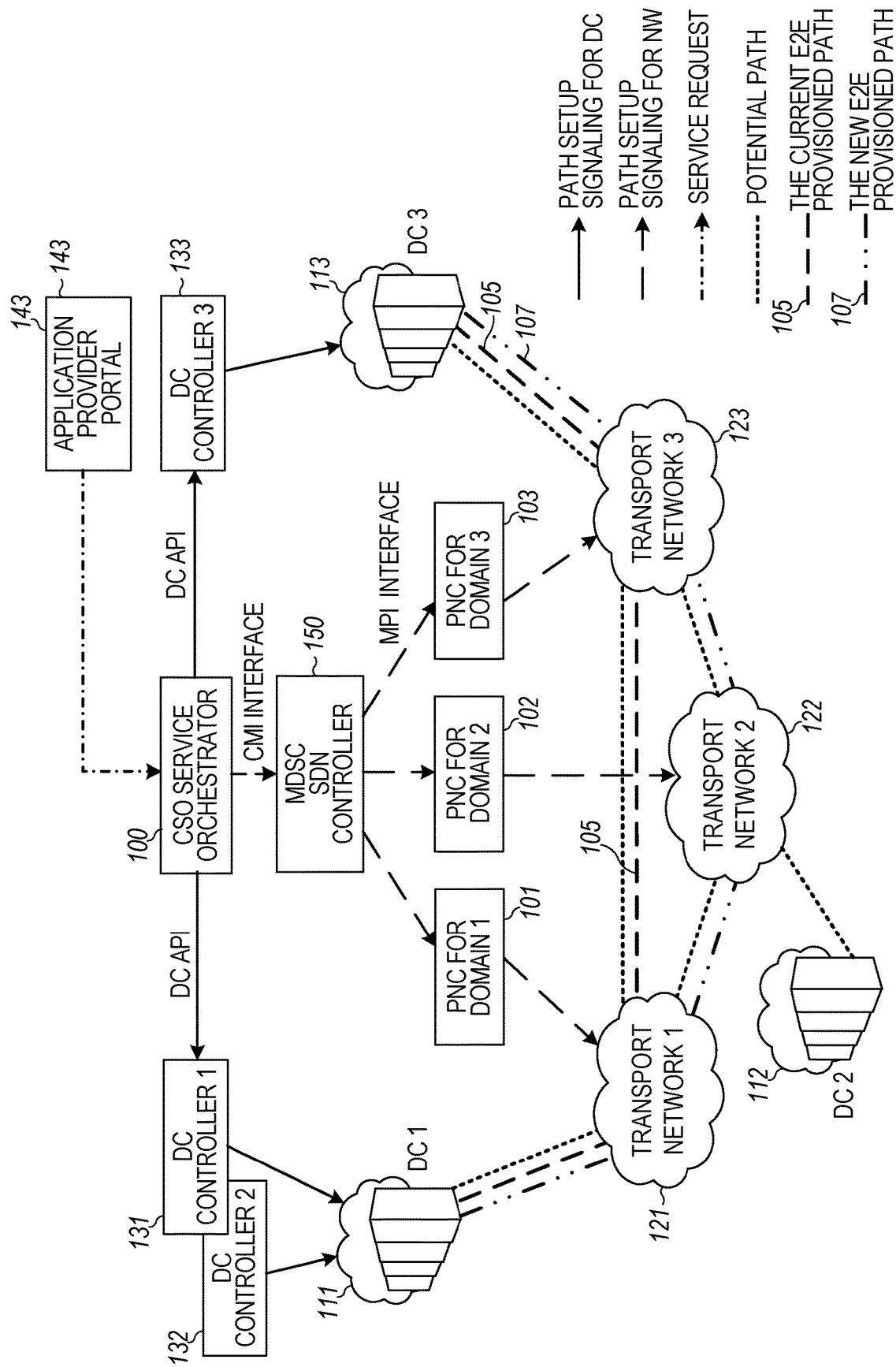
FIGS. 4A and 4B are block diagrams showing re-optimization and reconfiguration of the system for application-driven cross-stratum resource monitoring, according to various embodiments.
Figure 4B:
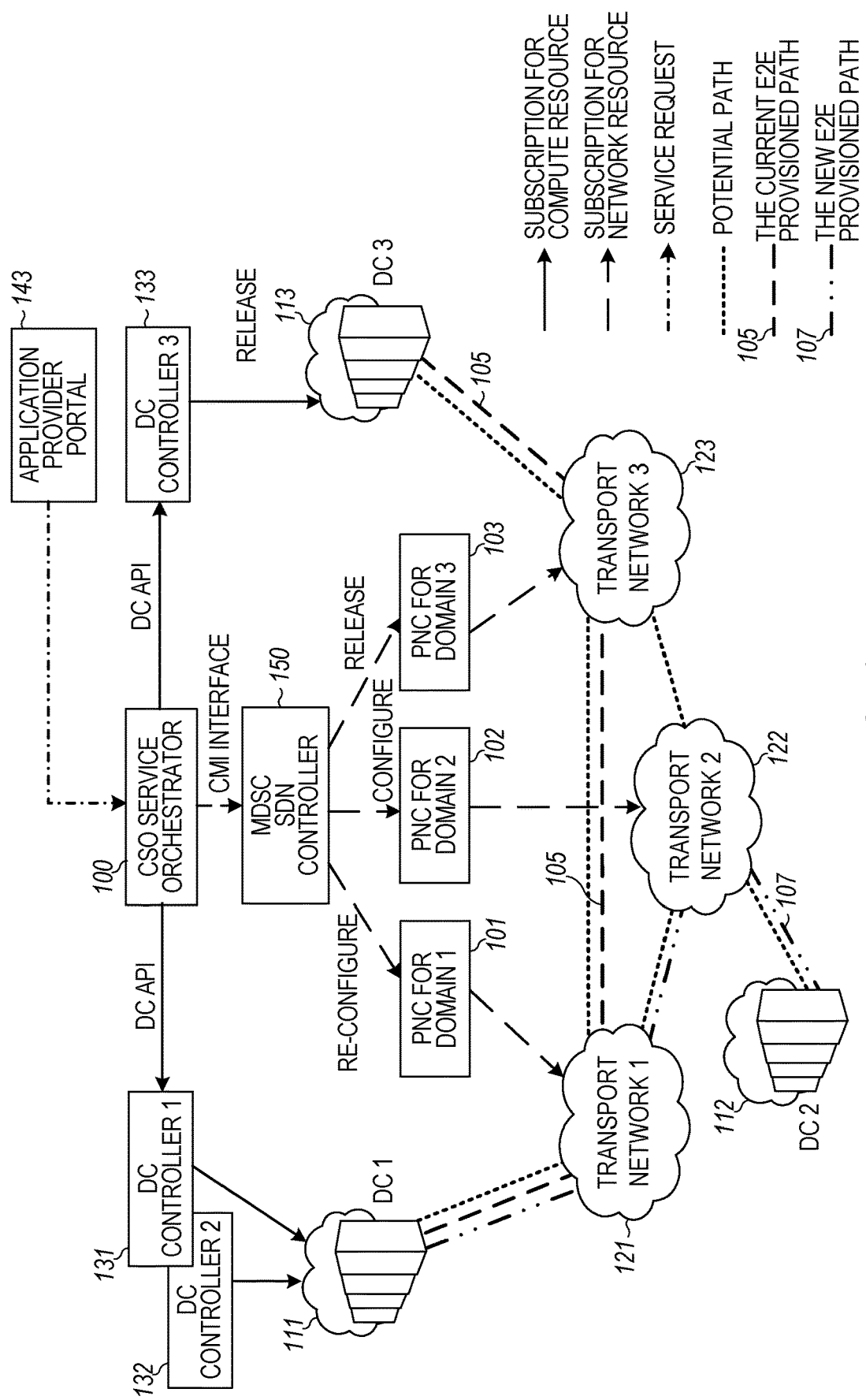

FIGS. 4A-4B illustrate block diagrams showing re-optimization and reconfiguration of the system for application-driven cross-stratum resource monitoring, according to various embodiments. Based on the performance data streamed to the CSO service orchestrator 100, the CSO service orchestrator 100 re-optimizes the existing E2E provisioning path (also referred to herein as a tunnel) and triggers the re-configuration message downstream. The MDSC SDN controller 150 receives the message and sends a re-configuration command to all pertinent PNCs 101, 102, 103 that are involved in the new E2E path. In FIG. 4A, the new E2E path begins at DC1 (111) to TN1 (121) to TN2 (122) to TN3 (123) to DC3 (113). Thus, the new E2E path adds TN2 (122) and uses the same endpoints (111, 113), so only the network needs to be involved and notified of the re-route. The network is notified of the re-route from the CSO orchestrator, and is involved by re-routing communications to use an alternate path based on the notification. In FIG. 4B, the new E2E path begins at DC1 (111) to TN1 (121) to TN2 (122) to DC2 (112). Since this path uses a new endpoint (112), both network and compute resources are changed, and the DC controllers 131, 132, 133 notify respective elements of the change.

Figure 5:
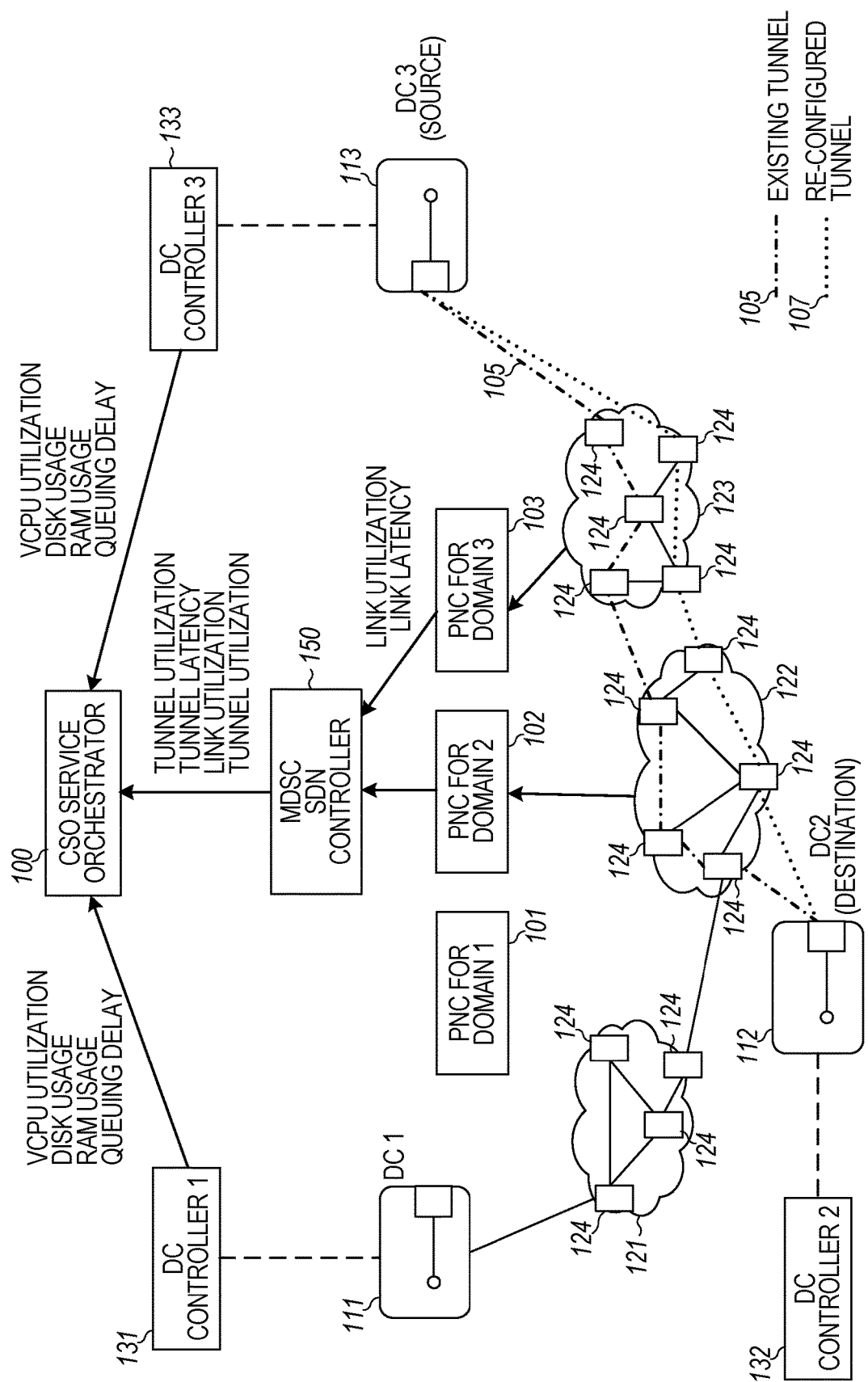
FIG. 5 is a subscription profile flow diagram for a system for application-driven cross-stratum resource monitoring, according to various embodiments.

FIG. 5 illustrates a subscription profile flow diagram for a system for application-driven cross-stratum resource monitoring, according to various embodiments. In the depicted embodiment, the existing path or tunnel begins at DC2 (112) to TN2 (122) to TN3 (123) to DC3 (113). The re-configured tunnel uses the same DC2 (112) to TN2 (122) to TN3 (123) to DC3 (113), while using different nodes 124 within the TNs (122, 123). Nodes 124 are shown to illustrate that a path can be re-configured within a transport network, in various embodiments. The CSO service orchestrator 100 receives information from the DC controllers 131, 132, 133 regarding CPU utilization, disk usage, RAM usage and queuing delay, in various embodiments. The CSO service orchestrator 100 receives information from the MDSC SDN controller 150 regarding tunnel utilization, tunnel latency, and link utilization, in various embodiments. The MDSC SDN controller 150 receives information from PNCs 101, 102, 103 regarding link utilization and link latency, and forward the information to the CSO service orchestrator 100, in an embodiment.

In various embodiments, any combination of sets of rules can be programmed based on streamed performance data. However, each set of rules is application-specific, such that different applications have a different set of rules based on the service catalogue. One example rule set includes: if Tunnel Utilization >=90% and Tunnel Latency >=100 ms and Destination DC Queuing Delay >=50 ms, then the CSO service orchestrator 100 will re-optimize and re-configure the tunnel or path. Thus, each element of performance data can be checked against a threshold to avoid excessive amounts of data flow. Other performance data elements can be used without departing from the scope of the present subject matter.

Figure 6:
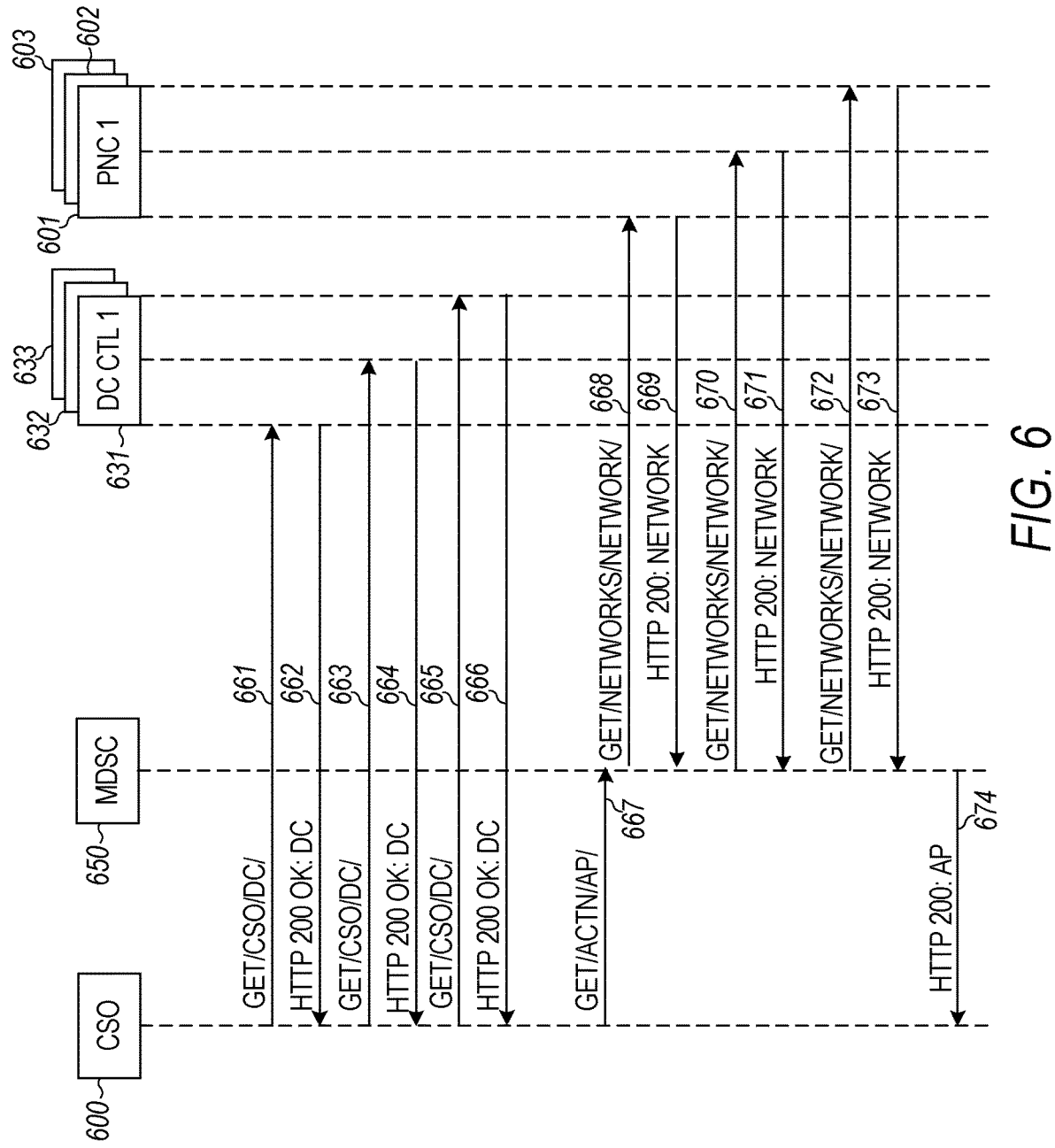
FIG. 6 is a resource discovery workflow diagram for a system for application-driven cross-stratum resource monitoring, according to various embodiments.

FIG. 6 illustrates a resource discovery workflow diagram for a system for application-driven cross-stratum resource monitoring, according to various embodiments. In the depicted embodiment, the CSO service orchestrator 600 discovers DC controllers 631, 632, 633 in the network as shown, and communicates with MDSC 650, which discovers PNCs 601, 602, 603 and relays this information back to CSO service orchestrator 600. In the following description, hypertext transfer protocol (HTTP) communication protocol is used between nodes in a system. An HTTP: 200 communication is a standard response for successful HTTP requests. The actual response depends on the request method used. In a GET request, the response contains an entity corresponding to the requested resource. In a POST request, the response contains an entity describing or containing the result of the action, in various embodiments. In the description below, SSE refers to streaming SIMD extensions, and SIMD refers to single instruction, multiple data, which is used in systems with multiple processing elements that perform the same operation on multiple data points simultaneously.

A GET/CSO/DC/communication 661 is sent from CSO 600 to DC controller 631, and the DC controller 631 sends a HTTP 200 OK:DC communication 662 in response. A GET/CSO/DC/communication 663 is sent from CSO 600 to DC controller 632, and the DC controller 632 sends a HTTP 200 OK:DC communication 664 in response. A GET/CSO/DC/communication 665 is sent from CSO 600 to DC controller 633, and the DC controller 633 sends a HTTP 200 OK:DC communication 666 in response. A GET/ACTN/AP/communication 667 is sent from CSO 600 to MDSC 650. The MDSC 650 sends a GET/NETWORKS/NETWORK/communication 668 to PNC 601, and PNC 601 sends a HTTP 200 NETWORK communication 669 in response. The MDSC 650 sends a GET/NETWORKS/NETWORK/communication 670 to PNC 602, and PNC 602 sends a HTTP 200 NETWORK communication 671 in response. The MDSC 650 sends a GET/NETWORKS/NETWORK/communication 672 to PNC 603, and PNC 603 sends a HTTP 200 NETWORK communication 673 in response. The MSDC 650 then sends a HTTP 200:AP communication 674 to CSO 600.

Figure 7:
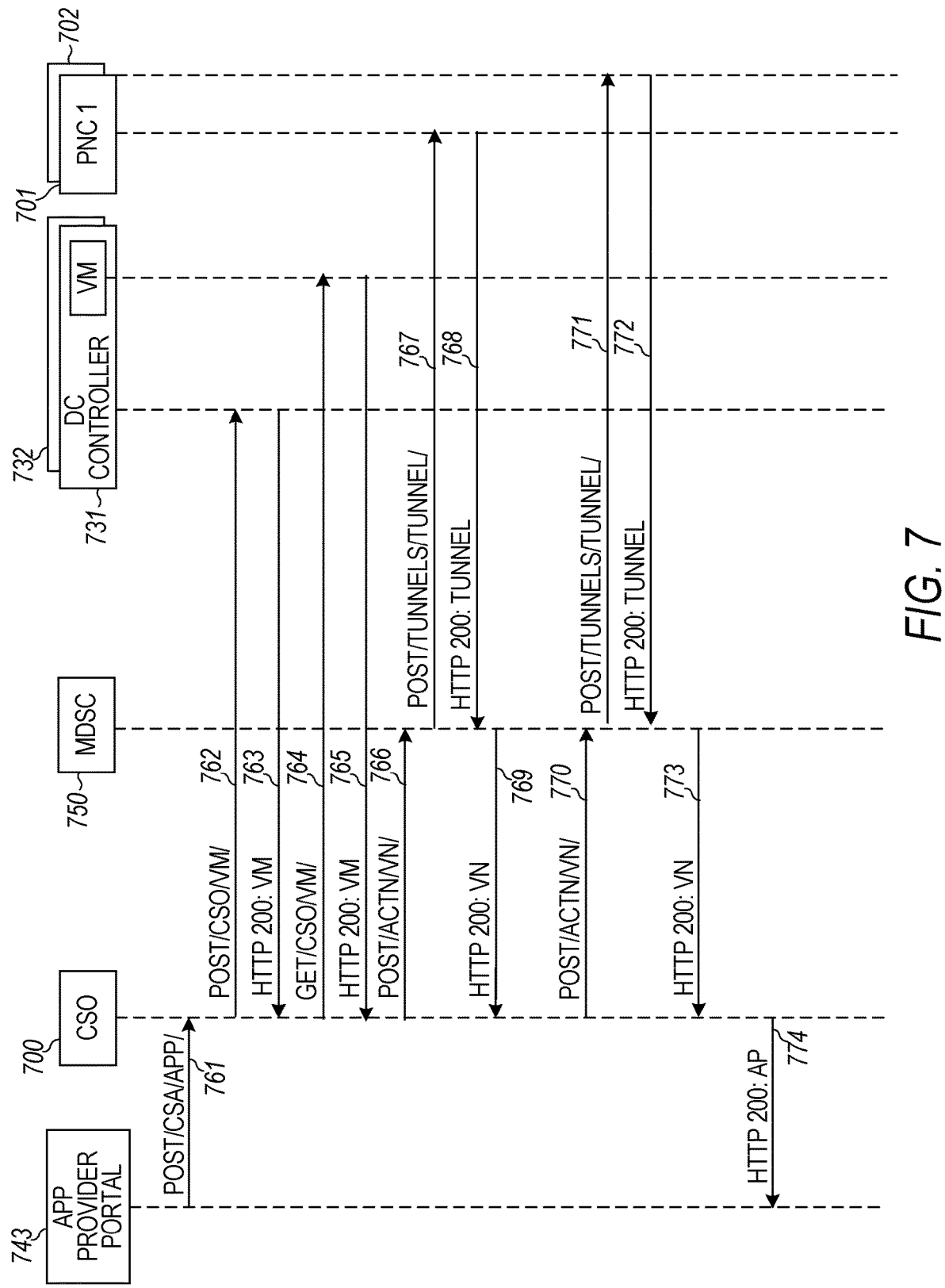
FIG. 7 is a provisioning workflow diagram for a system for application-driven cross-stratum resource monitoring, according to various embodiments.

FIG. 7 illustrates a provisioning workflow diagram for a system for application-driven cross-stratum resource monitoring, according to various embodiments. In the depicted embodiment, an application communicates with CSO service orchestrator 700 using application provider portal 743. The CSO service orchestrator 700 uses parameters provided by the application service catalogue and provisions workflow by communicating with DC controllers 731, 732 in the network, and communicates with MDSC 750, which provisions workflow for PNCs 701, 702. A POST/CSO/APP/communication 761 is sent from application provider portal 743 to CSO 700. The CSO 700 sends a POST/CSO/VM/communication 762 to DC controller 731, and DC controller 731 sends a HTTP 200:VM communication 763 in response. The CSO 700 sends a POST/CSO/VM/communication 764 to DC controller 732, and DC controller 732 sends a HTTP 200:VM communication 765 in response.

A POST/ACTN/VN/communication 766 is sent from CSO 700 to MDSC 750. The MDSC 750 sends a POST/TUNNELS/TUNNEL/communication 767 to PNC 701, and PNC 701 sends a HTTP 200: TUNNEL communication 768 in response. The MSDC 750 then sends a HTTP 200:VN communication 769 to CSO 700. A POST/ACTN/VN/communication 770 is sent from CSO 700 to MDSC 750. The MDSC 750 sends a POST/TUNNELS/TUNNEL/communication 771 to PNC 702, and PNC 702 sends a HTTP 200: TUNNEL communication 772 in response. The MSDC 750 then sends a HTTP 200:VN communication 773 to CSO 700. The CSO 700 sends a HTTP 200: APP communication 774 to application provider portal 743.

Figure 8:
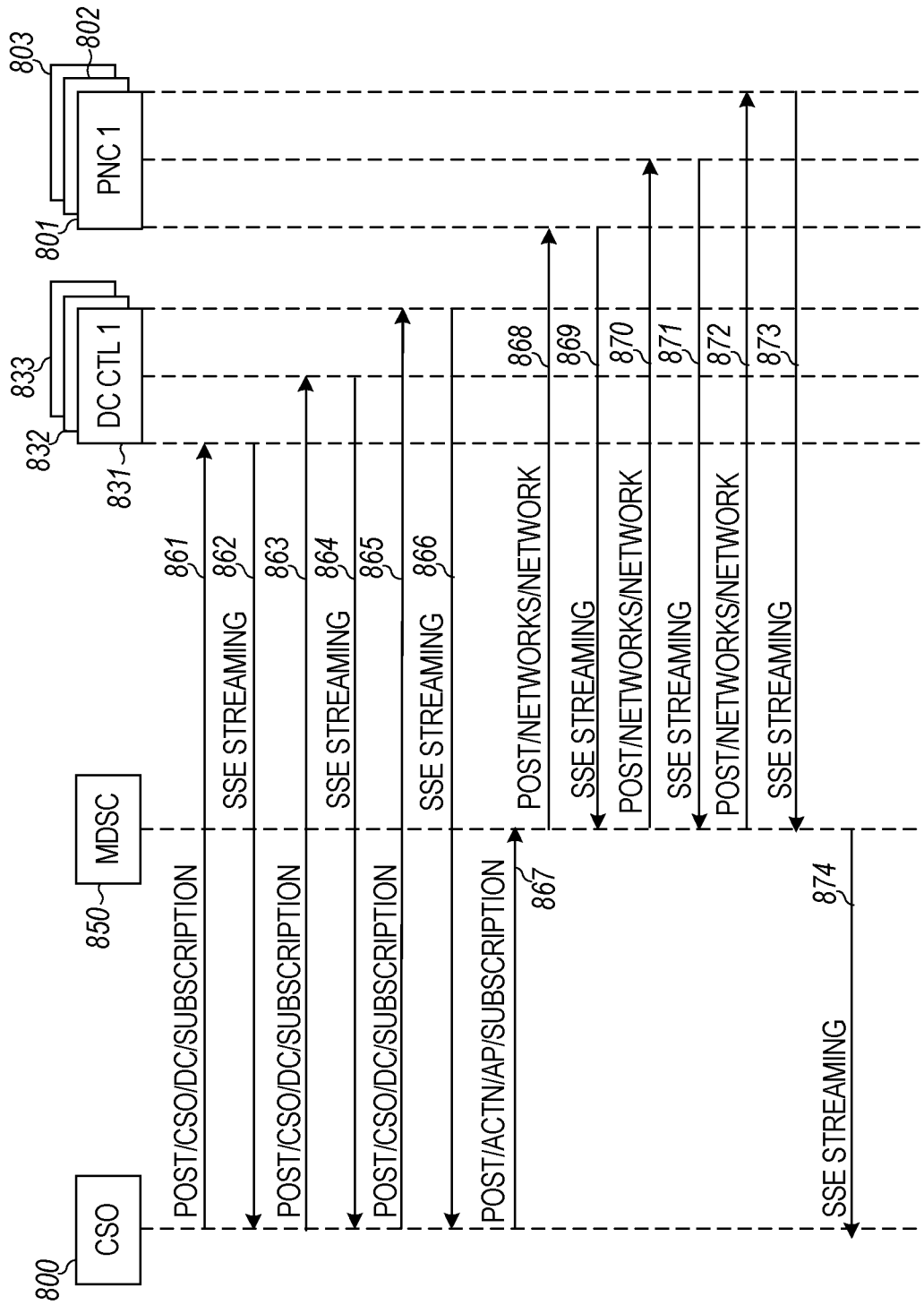
FIG. 8 is a notification subscription and publication workflow diagram for a system for application-driven cross-stratum resource monitoring, according to various embodiments.

FIG. 8 illustrates a notification subscription and publication workflow diagram for a system for application-driven cross-stratum resource monitoring, according to various embodiments. In the depicted embodiment, the CSO service orchestrator 800 communicates subscription information and receives publication data to and from DC controllers 831, 832, 833 in the network, and further communicates with MDSC 850, which communicates subscription information and receives publication data to and from PNCs 801, 802, 803, and relays this information back to CSO service orchestrator 800. A POST/CSO/DC/SUBSCRIPTION communication 861 is sent from CSO 800 to DC controller 831, and the DC controller 831 sends a SSE STREAMING communication 862 in response. A POST/CSO/DC/SUBSCRIPTION communication 863 is sent from CSO 800 to DC controller 832, and the DC controller 832 sends a SSE STREAMING communication 864 in response. A POST/CSO/DC/SUBSCRIPTION communication 865 is sent from CSO 800 to DC controller 833, and the DC controller 833 sends a SSE STREAMING communication 866 in response.

A POST/ACTN/A/SUBSCRIPTION communication 867 is sent from CSO 800 to MDSC 850. The MDSC 850 sends a POST/NETWORKS/NETWORK/communication 868 to PNC 801, and PNC 801 sends a SSE STREAMING communication 869 in response. The MDSC 850 sends a POST/NETWORKS/NETWORK/communication 870 to PNC 802, and PNC 802 sends a SSE STREAMING communication 871 in response. The MDSC 850 sends a POST/NETWORKS/NETWORK/communication 872 to PNC 803, and PNC 803 sends a SSE STREAMING communication 873 in response. The MSDC 850 then sends a SSE STREAMING communication 874 to CSO 800.

Benefits of the present subject matter include, but are not limited to: application requirements are always met; decisions are made before performance degradation or failures occur; and operating expense (OpEx) reduction is provided for autonomous orchestration. The present subject matter can be used in the Global SDN Controller Market Orchestrators, the DC Controllers, and other applicable SDN applications.

Figure 9:
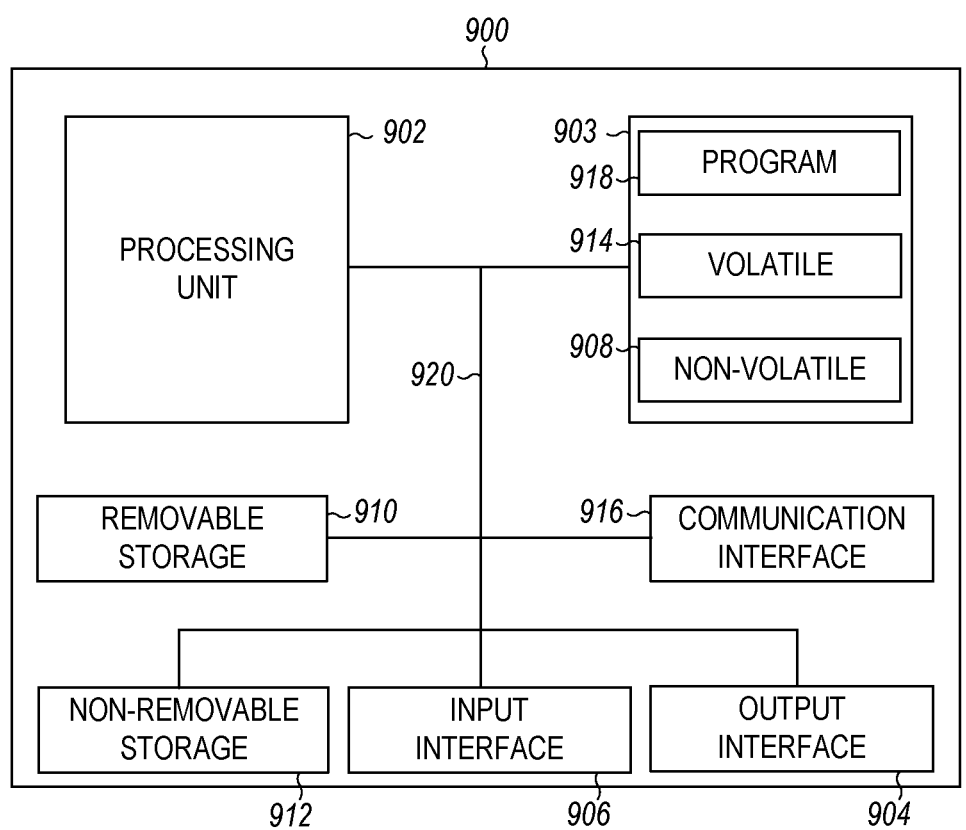
FIG. 9 is a block diagram illustrating circuitry for implementing algorithms and performing methods according to example embodiments.

FIG. 9 is a block diagram illustrating circuitry for performing methods of the described subject matter, according to example embodiments. All components need not be used in various embodiments. For example, different implementations may each use a different set of components.

One example, a computing device, in the form of a computer 900, may include a processing unit 902, memory 903, removable storage 910, and non-removable storage 912. Although the example computing device is illustrated and described as computer 900, the computing device may be in different forms in different embodiments. For example, the computing device may instead be a smartphone, a tablet, smartwatch, or other computing device including the same or similar elements as illustrated and described with regard to FIG. 9. Devices, such as smartphones, tablets, and smartwatches, are generally collectively referred to as mobile devices or user equipment. Further, although the various data storage elements are illustrated as part of the computer 900, the storage may also or alternatively include cloud-based storage accessible via a network, such as the Internet or server based storage.

Memory 903 may include volatile memory 914 and non-volatile memory 908. Computer 900 may include—or have access to a computing environment that includes—a variety of computer-readable media, such as volatile memory 914 and non-volatile memory 908, removable storage 910, and non-removable storage 912. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 900 may include or have access to a computing environment that includes input interface 906, output interface 904, and a communication interface 916. Output interface 904 may include a display device, such as a touchscreen, that also may serve as an input device. The input interface 906 may include one or more of a touchscreen, touchpad, mouse, keyboard, camera, one or more device-specific buttons, one or more sensors integrated within or coupled via wired or wireless data connections to the computer 900, and other input devices. The computer 900 may operate in a networked environment using a communication connection to connect to one or more remote computers, such as database servers. The remote computer may include a personal computer (PC), server, router, network PC, a peer device or other common network switch, or the like. The communication connection may include a Local Area Network (LAN), a Wide Area Network (WAN), cellular, WiFi, Bluetooth, or other networks. According to one embodiment, the various components of the computer 900 are connected with a system bus 920. Computer-readable instructions stored on a computer-readable medium are executable by the processing unit 902 of the computer 900, such as a program 918. The program 918 in some embodiments comprises software that, when executed by the processing unit 902, performs network switch operations according to any of the embodiments included herein. A hard drive, CD-ROM, and RAM are some examples of articles including a non-transitory computer-readable medium such as a storage device. The terms computer-readable medium and storage device do not include carrier waves to the extent carrier waves are deemed too transitory. Storage can also include networked storage, such as a storage area network (SAN). Computer program 918 may be used to cause processing unit 902 to perform one or more methods or algorithms described herein.

FIGS. 10A-10D, 11A-11D, and 12A-12D illustrate code listings of modules for performing methods according to example embodiments. FIGS. 10A-10D show a YANG (Yet Another Next Generation) module that defines reusable base types for CSO DC description, in various embodiments. YANG is a computer language for data modeling, and is used to define data for a NETCONF network configuration protocol. Thus, YANG modules function as a repository of information (or data model) which will be carried by RESTCONF or NETCONF as GET/PUT, etc. The depicted YANG modules show the data to be configured and the operational state of the configured data once it is configured. FIGS. 11A-11D show a YANG module that defines reusable base types for CSC service description, in various embodiments. FIGS. 12A-12D show a YANG module that defines reusable base types for TE network telemetry, in various embodiments.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

What is claimed is:
1. A method of using a Cross-Stratum Optimization (CSO) service orchestrator, the method comprising:
obtaining a service intent, a notification subscription, and a programmable performance rule specified by an application;
collecting streaming performance data in an aggregated telemetry network using the CSO service orchestrator based on the notification subscription;

evaluating performance of the network using the collected data and the programmable performance rule; and allocating one or more of storage, computer, and network resources based on the evaluation to ensure quality of service for the application.

2. The method of claim 1, wherein the network is a software defined network (SDN).

3. The method of claim 2, wherein the service intent includes one or more of compute intent, network intent, scaling intent, reservation, and pricing.

4. The method of claim 1, wherein allocating resources includes adding a transport network for communication among controllers.

5. The method of claim 4, wherein allocating resources includes adding multiple transport networks for communication among controllers.

6. The method of claim 1, wherein allocating resources includes removing a transport network for communication among controllers.

7. The method of claim 6, wherein allocating resources includes removing multiple transport networks for communication among controllers.

8. The method of claim 1, wherein the CSO service orchestrator is configured to change an end-to-end provisioning path based on the evaluation.

9. A Cross-Stratum Optimization (CSO) service orchestrator device, comprising:
   a memory configured to store programmable instructions; and
   a processor configured to act on the instructions to perform the steps of:
      obtaining a service intent, a notification subscription, and a programmable performance rule specified by an application;
      collecting streaming performance data in a network based on the notification subscription;
      evaluating performance of the network using the collected data and the programmable performance rule; and
      allocating one or more of storage, computer, and network resources based on the evaluation to ensure quality of service for the application,
      wherein the processor is configured to collect, evaluate, and allocate in a closed loop system.

10. The device of claim 9, further comprising:
sending a reconfiguration request message to a multi-domain service coordinator (MDSC) for distribution based on the allocation.

11. The device of claim 9, wherein the device is configured for cross-stratum operation in a software defined networks (SDN) telemetry network.

12. The device of claim 9, wherein the processor is configured to collect data from mobile terminals, infrastructure equipment and service, IP/transport SDN controllers, data center (DC) SDN controllers, and orchestrators.

13. The device of claim 9, wherein the programmable performance rule relates to an amount of data.

14. The device of claim 9, wherein the programmable performance rule relates to a latency amount.

15. The device of claim 9, wherein the processor is configured to allocate network resources by determining an alternate communication path between existing end points.

16. The device of claim 9, wherein the processor is configured to allocate network resources by creating a new communication path that includes a new end point.

17. A non-transitory computer-readable medium storing computer instructions, that when executed by one or more processors of a network device, cause the one or more processors to perform steps of:
   obtaining a service intent, a notification subscription, and a programmable performance rule specified by an application;
   collecting streaming performance data in a network using a Cross-Stratum Optimization (CSO) service orchestrator based on the notification subscription;
   evaluating performance of the network using the collected data and the programmable performance rule; and
   allocating one or more of storage, computer, and network resources based on the evaluation to ensure quality of service for the application,
   wherein the CSO service orchestrator is configured to send a reconfiguration request message to a multi-domain service coordinator (MDSC) for distribution based on the allocation.

18. The computer-readable medium of claim 17, wherein the network includes an aggregated telemetry network.

19. The computer-readable medium of claim 18, wherein evaluating network performance includes evaluating end-to-end (E2E) key performance indicators (KPIs).

20. The computer-readable medium of claim 17, wherein the one or more processors are configured to collect, evaluate, and allocate in a closed loop system.

* * * * *

UNITED STATES PATENT AND TRADEMARK OFFICE
CERTIFICATE OF CORRECTION

PATENT NO. : 10,630,563 B2
APPLICATION NO. : 15/903985
DATED : April 21, 2020
INVENTOR(S) : Lee et al.

It is certified that error appears in the above-identified patent and that said Letters Patent is hereby corrected as shown below:

On the Title Page

Page 2, in Column 1, Item (56), under "Other Publications", Line 8, delete "Cross Strutum Ochestration" and insert --Cross-Stratum Orchestration-- therefor Signed and Sealed this
Seventh Day of July, 2020

Andrei Iancu
*Director of the United States Patent and Trademark Office*